(12) United States Patent
Jones

(10) Patent No.: US 8,680,701 B2
(45) Date of Patent: Mar. 25, 2014

(54) CIRCUIT AND METHOD FOR REGULATING A DC VOLTAGE APPLIED BETWEEN A FIRST AND SECOND DC VOLTAGE TERMINAL

(75) Inventor: Rodney Jones, Stoke on Trent (GB)

(73) Assignee: Siemens Aktiengesellschaft, Munich (DE)

( * ) Notice: Subject to any disclaimer, the term of this patent is extended or adjusted under 35 U.S.C. 154(b) by 250 days.

(21) Appl. No.: 13/307,332

(22) Filed: Nov. 30, 2011

(65) Prior Publication Data

US 2012/0147634 A1  Jun. 14, 2012

(30) Foreign Application Priority Data

Dec. 8, 2010 (EP) .................................... 10194148

(51) Int. Cl.
*H02P 9/04* (2006.01)
(52) U.S. Cl.
USPC .................. 290/44; 290/55; 322/44; 322/48; 361/18; 361/20; 361/91.8
(58) Field of Classification Search
USPC ............... 290/44, 55; 322/44, 48; 361/18, 20, 361/91.8
See application file for complete search history.

(56) References Cited

U.S. PATENT DOCUMENTS

| 4,812,729 | A | * | 3/1989 | Ito et al. ........................ 318/732 |
| 7,164,562 | B2 | * | 1/2007 | Virtanen ......................... 361/20 |
| 7,518,256 | B2 | * | 4/2009 | Juanarena Saragueta et al. ............................. 290/44 |
| 7,709,972 | B2 | * | 5/2010 | Arinaga et al. .................. 290/55 |
| 8,373,293 | B2 | * | 2/2013 | Engelhardt et al. ............. 290/44 |
| 2005/0237678 | A1 | * | 10/2005 | Virtanen ......................... 361/18 |
| 2006/0192390 | A1 | * | 8/2006 | Juanarena Saragueta et al. ............................. 290/44 |
| 2009/0079193 | A1 | | 3/2009 | Nielsen et al. |
| 2009/0273185 | A1 | | 11/2009 | Ruiz Flores et al. |

FOREIGN PATENT DOCUMENTS

| DE | 19833490 A1 | 1/2000 |
| DE | 102007005165 A1 | 8/2007 |
| WO | WO 03065567 A1 | 8/2003 |
| WO | WO 2010045964 A1 | 4/2010 |

* cited by examiner

*Primary Examiner* — Bao Q Vu

(57) ABSTRACT

A circuit for regulating a DC voltage is provided. The circuit includes: a controllable switch system, a resistor, a first control circuit and a second control circuit. The controllable switch system includes a first terminal, a second terminal, a first control terminal, and a second control terminal. The controllable switch system is configured to establish an electrical connection between the first terminal and the second terminal, if a first control signal applied to the first control terminal satisfies a first criterion or if a second control signal applied to the second control terminal satisfies a second criterion; A method for regulating a DC voltage and an AC-to-AC-converter are described.

17 Claims, 3 Drawing Sheets

CIRCUIT AND METHOD FOR REGULATING A DC VOLTAGE APPLIED BETWEEN A FIRST AND SECOND DC VOLTAGE TERMINAL

CROSS REFERENCE TO RELATED APPLICATIONS

This application claims priority of European Patent Office application No. 10194148.2 EP filed Dec. 8, 2010, which is incorporated by reference herein in its entirety.

FIELD OF INVENTION

The present invention relates to a circuit and to a method for regulating a DC voltage applied between a first DC voltage terminal and a second DC voltage terminal. Further, the present invention relates to an AC-to-AC converter for converting a first frequency AC-voltage to a second frequency AC-voltage, wherein the converter comprises the circuit for regulating a DC voltage.

ART BACKGROUND

In a conventional AC-to-AC converter (in particular converting a variable frequency AC voltage to a fixed frequency AC voltage) a first section may convert an AC-voltage (or current or power) to a DC-voltage (or current or power) generated at a so-called DC-link. A second section of the converter may convert the DC-voltage at the DC-link to a (in particular fixed frequency) AC-voltage (or current or power). In order to protect electronic components comprised in the AC-to-AC converter the conventional converter may comprise a so-called voltage clamp system connected between terminals of the DC-link. For example, a permanent magnet generator may release a current (in particular during shutdown) which may result in an overvoltage of the DC-link. For maintaining the voltage within the operational (switching) range of the semiconductor devices of the power converter system (also referred to as AC-to-AC-converter) the voltage clamp system comprises an isolated gate bipolar transistor (IGBT) or a similar force commutated device and a voltage clamp resistor (also known as a braking resistor or dynamic braking resistor). The overall combination of the control system managing the voltage clamping IGBT, the voltage clamping IGBT and the voltage clamping resistor may be referred to as the "voltage clamp".

In a conventional power converter so-called DC-link capacitors are connected between the terminals of the DC-link. These capacitors are dimensioned such that the resulting (unclamped) overvoltage is maintained within the ultimate voltage limit for any and all of the power components connected to the DC-link of the power converter.

If the "voltage clamp" operates correctly, the dc link voltage is maintained at a level where switching of the other power semi-conductor devices connected to the dc link can continue. However, in an event of a non-operation of the voltage clamp, the DC-link capacitors have to act as the passive energy dump, in order to store the energy of the typically high inductance characteristics of the permanent magnet generator. To act as an effective energy dump, the capacitors require large values of capacitance. To achieve the large values of capacitance required to achieve the passive energy dump of sufficient size to absorb the energy released from the generator and to keep below the ultimate voltage limit for the power components comprised in the converter, generally electrolytic capacitors are selected. Electrolytic capacitors offer a very economic solution for low voltage solutions, say 800 V or 1100 V DC-link voltages, however at higher voltages metalized polypropylene capacitors are generally the preferred choice. Metalized polypropylene capacitors (MP capacitors) may offer a much higher ripple current rating than the equivalent electrolytic capacitors and may have also much longer lifetime. The disadvantage of MP capacitors however is that for the same capacitance value they are much larger and have a much higher cost. Thereby, the overall cost of the power converter may increase.

There may be a need for a high integrity voltage clamp system which can be used in an AC-to-AC power converter and which allows to construct the AC-to-AC power converter in a cost-effective way. Further, there may be a need for an AC-to-AC power converter which is cost effective and which has a compact dimension. Further, there may be a need for a voltage clamp effectively protecting electronic components comprised in the AC-to-AC power converter without increasing the costs of the power converter in an excessive manner. Further, there may be a need for an AC-to-AC power converter which may deal with the ultimate voltage limiting function without having to include capacitors of large capacitance values.

SUMMARY OF THE INVENTION

This need may be met by the subject matter according to the independent claims. Advantageous embodiments of the present invention are described by the dependent claims.

According to an embodiment a circuit for regulating (or controlling or maintaining at a predetermined value) a DC voltage (which is substantially constant but may comprise small voltage oscillations which may be caused by ripple currents) applied between a first DC voltage terminal and a second DC voltage terminal, wherein the circuit comprises a controllable switch system (comprising at least one switch, such as a transistor, a conduction state of which may be controlled by an external signal); a resistor; a first control circuit; and a second control circuit.

The controllable switch system has a first terminal connectable to the first DC voltage terminal, a second terminal, a first control terminal, and a second control terminal, wherein the controllable switch system is adapted to establish an electrical connection (in particular during a conduction state of the controllable switch system) between the first terminal and the second terminal, if a first control signal (such as a particular voltage or current or power) applied to the first control terminal satisfies a first criterion (such as a voltage threshold, a current threshold or a power threshold or a logical criterion) or if a second control signal (such as a voltage signal, a current signal, or a power signal) applied to the second control terminal satisfies a second criterion (such as a voltage threshold, a current threshold or a power threshold or a logical criterion). Thus, the controllable switch system may be controlled by a signal applied to the first control terminal or/and by a signal applied to the second control terminal. The signal applied to the first control terminal may in an appropriate way be combined or mixed with the signal applied to the second control terminal or a logical operation may be performed on both signals. This combining or mixing may comprise computations or processing the signal applied to the first control terminal and the signal applied to the second control terminal.

According to an embodiment, the first criterion may e.g. be satisfied, if the first control signal is a logical high value, and the second criterion may e.g. be satisfied, if the second control signal is a logical high value. In this case the controllable switch system may perform a simple logical "OR"-operation on the (logical) first control signal and the (logical) second control signal. The "comparator functions" may then exclusively be performed by the first control circuit and the second control circuit.

According to another embodiment, the first criterion may e.g. be satisfied, if the first control signal is a logical low value, and the second criterion may e.g. be satisfied, if the second control signal is a logical low value. In this case the controllable switch system may perform a simple logical "NAND"-operation on the (logical) first control signal and the (logical) second control signal. The "comparator functions" may then exclusively be performed by the first control circuit and the second control circuit.

In any case, if the DC voltage is either above the first DC voltage threshold or above the second DC voltage threshold, the controllable switch system will establish an electrical connection between the first terminal and the second terminal.

The resistor has a first resistor terminal connected to the second terminal and has a second resistor terminal connectable to the second DC voltage terminal. Via the resistor an overvoltage or the energy associated with the overvoltage may be dissipated, when a connection is established from the DC voltage terminal via the controllable switch system and via the resistor to the second DC voltage terminal.

The first control circuit is adapted for generating the first control signal (which is supplied to the first control terminal) at a first control output terminal connected to the first control terminal, wherein the first control signal is generated to satisfy the first criterion (or e.g. to be above the first threshold), if the DC voltage (between the first DC voltage and the second DC voltage terminal) is above a first DC voltage threshold. Thus, the first control circuit may comprise means for detecting or sensing the DC voltage between the first DC voltage and the second DC voltage terminal.

The second control circuit is adapted for generating the second control signal at a second control output terminal connected to the second control terminal, wherein the second control signal is generated to satisfy the second criterion (or e.g. to be above the second threshold), if the DC voltage is above a second DC voltage threshold. Thus, also the second control circuit may comprise means for detecting or sensing the DC voltage between the first DC voltage terminal and the second DC voltage terminal.

In particular, the second control circuit may be differently constructed and/or arranged than the first control circuit. In particular, the second control circuit may be an autonomous trigger circuit (separated from the first control circuit) which is responsive to a higher overvoltage threshold (such as for example 1400 V) than the first control circuit. In particular, the second control circuit may be a logic circuit which is constructed in a simple manner comprising for example a comparator to compare the DC voltage with the second DC voltage threshold and to generate the second control signal to satisfy the second criterion (or e.g. to be above the second threshold), if the DC voltage is above the second DC voltage threshold. In particular, the second control circuit may not comprise any software controlled components. In contrast, the first control circuit may be software controlled, thus being not exclusively dependent on the DC voltage. The second control circuit may exclusively be controlled by the DC voltage between the first DC voltage terminal and the second DC voltage terminal.

The second DC voltage threshold (above which the second control signal is generated to satisfy the second criterion or e.g. to be above the second threshold) is greater (such as by at least 100 V or 200 V) than the first DC voltage threshold (above which the first control signal is generated to satisfy the first criterion or e.g. to be above the first threshold). Thus, when the DC voltage raises above the first DC voltage threshold, the first control circuit will generate the first control signal to satisfy the first criterion or e.g. to be above the first threshold such that the controllable switch system establishes an electrical connection between the first terminal and the second terminal. However, the establishment of the electrical connection may fail. In this case, the DC voltage may rise still further to reach the second DC voltage threshold. In this case the second control circuit (acting as a fallback circuit in case the first control circuit fails or in case the controllable switch system does not properly function with respect to the first control terminal) will generate the second control signal to satisfy the second criterion or e.g. to be above the second threshold such that the controllable switch system establishes an electrical connection between the first terminal and the second terminal. Thereby, an overvoltage may be reduced for preventing damage to electrical or electronic components of circuitry connected between the first DC voltage terminal and the second DC voltage terminal. Thereby, the second control circuit may act as an emergency circuit, when the function of the controllable switch system being controlled exclusively by the first control circuit fails.

In particular, with the present embodiment the MP capacitors may be integrated into the power converter without having to increase their capacitance and hence cost to deal with the ultimate voltage limiting function through passive means. Typical operational voltage levels for the IGBT switch associated with the voltage clamp switch may be 1100 V for an IGBT device with a non-switching (VCE sustaining) rating of 1700 V.

In a conventional system, under a fault condition of the direct drive generator (for example of a wind turbine) with a massive electrolytic capacitor bank, the bank is dimensioned such that the ultimate overvoltage is less than 1700 V which is the limiting voltage for the IGBT device in this example. According to an embodiment the MP capacitor in the system may be dimensioned for all requirements except the ultimate overvoltage surge requirement. Thus, according to an embodiment a MP capacitor bank of say 25% of the capacitance of the electrolytic bank may be required. According to an embodiment the operation of the voltage clamp (also referred to as circuit for regulating a DC voltage) of the present embodiment may be ensured, in order to protect the further electronic components from an overvoltage. Thus, a high integrity voltage clamp system is provided.

According to an embodiment the current flowing through the resistor may be measured and/or monitored. The current should correlate with the signal (the first control signal and/or the second control signal) generated by the first control circuit and the second control circuit, respectively. Further, the measured current should correlate with the DC voltage. If an adequate correlation is not achieved, then the power converter (into which the circuit for regulating a DC voltage may be integrated) may be shut down completely by opening circuit breakers to the electric generator and network, respectively (full current rated circuit breakers in series with G1-G3 connection to the variable frequency generator and N1-N3 connection to the network connection via filtering circuits as necessary) and the lack of adequate correlation may be investigated.

According to an embodiment the second control circuit is further adapted to generate the second control signal to be above the second threshold during a test time interval between $1/100000$ and $1/10000$ of an operation time of the circuit in order to test the controllable switch system. In particular, the second control circuit allows to test the functionality of the controllable switch system during a very small portion of an operation time of the circuit. Thereby, excessive energy loss may be prevented. In case the controllable switch system passes the test, no measure may be taken. In case the controllable switch system does not pass the test, other measures for preventing electronic components from damage may be taken, such as complete shutdown of the electronic components connected between the first DC voltage terminal and the second DC voltage terminal.

According to an embodiment the second control system comprises a pulse generator for generating, in particular repeating, test pulses as the second control signal. For example, a short pulse (for example 5 μs) on a periodic basis (for example 1 per second) may be generated by the pulse generator to turn on the controllable switch system. This would cause current flow into the voltage clamp resistor that would be detected by the current sensor. A software of the controller may detect this signal and recognize the periodic rise in current as an indication that the controllable switch system is operational (in particular regarding its control via the second control terminal). The magnitude of the current flowing through the resistor would be correlated with the prevailing DC-link voltage and the resistance value of the voltage clamp resistor. Failure to detect the periodic raising of the current (or the raising due to the test pulse) may initiate a controlled shutdown of electronic components connected between the first DC voltage terminal and the second DC voltage terminal (in particular components of an AC-to-AC converter). In particular, the generator and network circuit breakers may be opened. The additional power rating required in the voltage clamp resistor to absorb the power associated with the testing function (by providing test pulses as the second control signal) may be for example 1/20000 of the rated power of the resistor. Other values are possible.

According to an embodiment failure modes of the circuit for regulating a DC voltage may be evaluated and all eventualities may be covered or the probability of such eventualities may be considered very low. In particular, the following four scenarios may be considered: (1) circuit not intended to operate, circuit does not operate; (2) circuit not intended to operate, circuit operates; (3) circuit intended to operate, circuit does not operate; and (4) circuit intended to operate, circuit operates.

Scenarios 1 and 4 are "normal". This normal behaviour can be seen by the current sensor measuring the current flowing through the resistor and coordination with the first control signal generated by the first control circuit. If the current sensor is itself defective, then this can also be detected as there will be a command to turn on the normal voltage clamp circuit without expected feedback. This situation may be recognized and an orderly shutdown of the system may be initiated.

Scenario 2 could be caused by either of the first and second control terminals of the controllable switch system or the either of the first and second control signals applied to these terminals operating inappropriately.

Alternatively the controllable switch system may comprise two voltage clamp switches, in which case Scenario 2 could be caused by either of the two voltage clamp switches comprised within the controllable switch system operating inappropriately. The current sensor may detect current when there was not expected to be current and the system is shutdown in an orderly manner including the opening of the generator and network circuit breakers. The voltage clamp resistors are rated for the extra energy received into them during the delay to open the circuit breakers.

Scenario 3 could be caused by the failure of both of the control circuits, the first control circuit and the second control circuit. Although this is low probability, the consequence is severe, leading to massive overvoltage, catastrophic device failure, etc. To detect the scenario 3 the testing function as described above is provided. Thereby, an appropriate measure may be taken to protect electronic components.

According to an embodiment the circuit for regulating a DC voltage further comprises a current sensor arranged such as to measure the current flowing through the resistor, in particular arranged between the second terminal and the first resistor terminal for measuring a current value indicative of an electric current flowing from the second terminal to the first resistor terminal. In particular, the current sensor may be utilized for testing the controllable switch system. In particular, when the second control circuit generates a test pulse the controllable switch system should switch to a conducting state (due to the controlling at the second control terminal) which is expected to result in a current flowing through the resistor. Failure to detect current in this situation may indicate that the controllable switch system (in particular regarding its control via the second control terminal) is defective.

According to an embodiment the circuit for regulating a DC voltage further comprises a controller adapted to receive the current value and to receive the second control signal, wherein the controller is adapted to indicate a failure of the circuit based on the current value and on the second control signal. The failure may indicate that the emergency function of the controllable switch system is defective. It may not be mandatory to monitor the second control signal into the controller.

According to an embodiment the controllable switch system comprises a single transistor having a gate terminal connected to the first control terminal and to the second control terminal (which may be directly connected or may be connected via additional circuitry allowing to process signals applied at the first control terminal and the second control terminal), having a first single transistor terminal connected to the first terminal and having a second single transistor terminal connected to the second terminal. Depending on a signal applied to the gate terminal of the single transistor a conducting state or a non-conducting state may be established between the first single transistor terminal and the second single transistor terminal. In particular, the controllable switch system may comprise only the single transistor but no further transistor or controllable switch. Thereby, a particular simple construction of the controllable switch system is enabled.

According to an embodiment the controllable switch system comprises a first transistor having a gate terminal connected to the first control terminal, having a first transistor terminal connected to the first terminal and having a second transistor terminal connected to the second terminal. Depending on a signal applied to the gate terminal of the first transistor a conducting state or a non-conducting state may be established between the first transistor terminal and the second transistor terminal. Thereby, the first transistor may be switched on or off. When the first transistor is switched on (conducting state between the first transistor terminal and the second transistor terminal) an overvoltage applied between the first DC voltage terminal and the second DC voltage terminal may be discharged by current flow via the first transistor (from the first transistor terminal to the second transistor terminal), via the resistor to the second DC voltage terminal. Thereby, a DC voltage may be clamped to maintain appropriate values, to in particular not exceed a particular threshold. In particular, the circuit for regulating the DC voltage may comprise one or more further transistor(s). In the context of the present invention the term "transistor" may be used as a synonym of a controllable switch, in which a conduction state of the switch (turned on or turned off) may be controlled by an external signal.

According to an embodiment the controllable switch system comprises a second transistor having a gate terminal connected to the second control terminal and having a further first transistor terminal connected to the first terminal and having a further second transistor terminal connected to the second terminal. Thus, according to an embodiment the circuit for regulating a DC voltage comprises a first transistor and a second transistor, wherein the first transistor is controlled via the first control circuit and the second transistor is controlled via the second control circuit. Thus, the first transistor is controlled independently of the second transistor.

The first transistor may for example be an IGBT which may be designed to prevent overvoltages of for example 1200 V so that voltage surges occurring during resulting switch off events of the generator are kept below 1700 V (the VCE sus rating). Then the resulting overvoltage from the direct drive generator fed shutdown for a configuration using a MP capacitor (dimensioned for all other aspects but not surge) may exceed the rating of the IGBTs of the power converter and major failure may take place. In this situation the second transistor may be controlled to become conducting to discharge the overvoltage.

According to an embodiment the first transistor and/or the second transistor and/or the single transistor is an IGBT, a MOSFET, a bipolar junction transistor, a GTO, or an IGCT. Thereby, conventionally available transistors may be utilized within the circuit for limiting the costs of the circuit.

In particular, when the controllable switch system comprises the second transistor, the controllable switch system may be tested by switching the second transistor to a conducting state during a small portion of an operation time of the circuit (for example using test pulses, as described above).

According to an embodiment the controllable switch system comprises (a first transistor but not a second transistor) a thyristor having a gate terminal connected to the second control terminal, having a first thyristor terminal connected to the first terminal and having a second thyristor terminal connected to the second terminal. Depending on a signal applied at the gate terminal of the thyristor a connection may be established between the first thyristor terminal and the second thyristor terminal. In particular, the thyristor may be arranged in parallel to the first transistor to provide an additional means for discharging an overvoltage between the first DC voltage terminal and the second DC voltage terminal. In particular, the thyristor is operated (or controlled) by an autonomous trigger circuit (the second control circuit) that is responsive to a higher overvoltage threshold (for example 1400 V). Thereby, the augmented voltage clamp circuit can still limit the overvoltage with the rating of all the power converter components, without over-dimensioning the value of the DC-link capacitance to do the same function passively. In particular, the thyristor may be a useful device in this application, as it does not require any gate power to remain on after triggering. The thyristor would not be a candidate device for the normal operational voltage clamp function (in particular would not be a candidate for the first transistor), as it is not ideally suited to force commutation (not providing the opportunity to be turned off from the first control circuit).

After having monitored and confirmed the integrity of the voltage clamp resistor (by sensing current flow in correspondence to the first control signal and/or the second control signal) in the event of an overvoltage (for example 1400 V between the first DC voltage terminal and the second DC voltage terminal) the second control circuit (in particular the autonomously operating comparator comprised in the second control circuit) may fire the thyristor to set the thyristor in a conducting state. The operation of the thyristor may be monitored by monitoring current flowing into the current sensor. Current being detected in the current sensor, when voltage clamp current is not expected may cause the circuit breakers to generator and network, respectively, to be opened. The voltage clamp resistors may be needed to be rated to cope with the ensuing delay to open the circuit breakers (say 100 ms) as well as the energy that was intended to be dissipated in the voltage clamp resistors before this particular fault condition was detected.

According to an embodiment the circuit for regulating a DC voltage further comprises a diode connected between the second terminal and connectable to the second DC voltage terminal. In particular, an anode of the diode may be connectable to the second DC voltage terminal and a cathode of the diode may be connected to the second terminal. In particular, the diode may be connected in parallel to the resistor.

According to an embodiment the second control circuit has a second control circuit input terminal connectable to the first DC voltage terminal and a further second control circuit input terminal connectable to the second DC voltage terminal. Thereby, the second control circuit may monitor the DC voltage between the first DC voltage terminal and the second DC voltage terminal.

According to an embodiment a AC-to-AC converter for converting a first frequency (in particular variable frequency) AC-voltage (or current or power) to a second frequency (in particular substantially fixed frequency, such as 50 Hz or 60 Hz) AC-voltage (or current or power) is provided, wherein the converter comprises a first converter section for converting the first frequency AC-voltage to a DC-voltage between a first DC voltage terminal and a second DC voltage terminal; a circuit for regulating a DC voltage applied between the first DC voltage terminal and the second DC voltage terminal as described above; and a second converter section for converting the DC-voltage between the first DC voltage terminal and the second DC voltage terminal to the second frequency AC-voltage.

In particular, the first converter section and also the second converter section may comprise one or more (in particular six) power transistors, such as IGBTs. The first frequency AC-voltage may be supplied from one or more generators of one or more wind turbines. In particular, a generator of a wind turbine may generate a variable frequency AC-voltage, wherein the frequency of the first frequency AC-voltage may depend on a wind condition, a blade pitch angle and other environmental parameters. In particular, the second frequency AC-voltage may be supplied to a utility grid which allows consumers to receive electric energy for driving consumer devices. Having the circuit for regulating the DC voltage connected between the first DC voltage terminal and the second DC voltage terminal allows preventing an overvoltage to protect components comprised in the first converter section as well as in the second converter section.

It should be understood that any features (individual or in any combination) disclosed, described or explained with respect to a circuit for regulating a DC voltage or an AC-to-AC converter may also be applied (individually or in any combination) to a method for regulating a DC voltage.

According to an embodiment a method for regulating a DC voltage applied between a first DC voltage terminal and a second DC voltage terminal is provided, wherein the method comprises establishing an electrical connection between a first terminal connectable to the first DC voltage terminal and a second terminal, if a first control signal is above a first threshold or if a second control signal is above a second threshold; allowing current to flow through a resistor via a first resistor terminal connected to the second terminal towards a second resistor terminal connectable to the second DC voltage terminal; generating the first control signal to be above the first threshold, if the DC voltage is above a first DC voltage threshold; and generating the second control signal to be above the second threshold, if the DC voltage is above a second DC voltage threshold, wherein the second DC voltage threshold is greater than the first DC voltage threshold.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

Embodiments of the present invention are now described with reference to the accompanying drawings.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
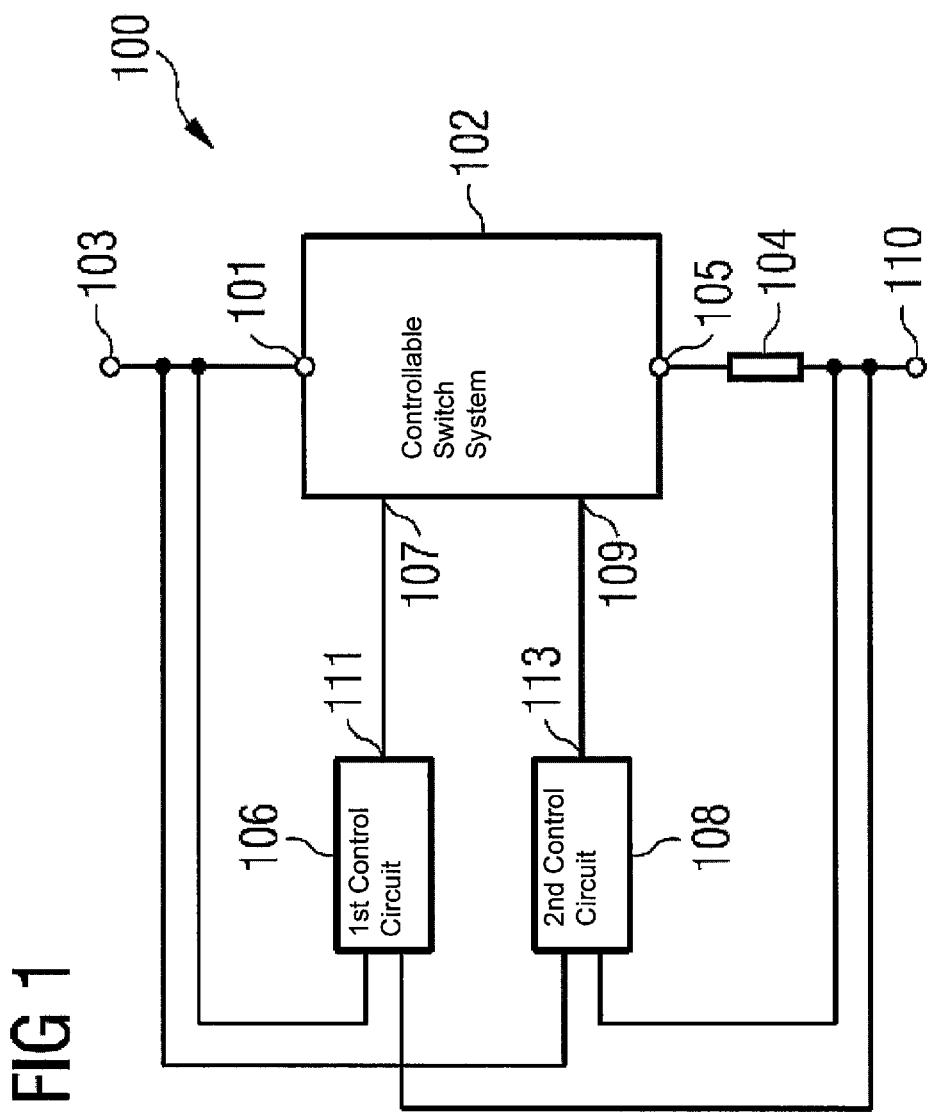
FIG. 1 schematically shows a circuit diagram of a circuit for regulating a DC voltage according to an embodiment.

The illustration in the drawing is shown in schematic form. It is noted that in different figures, similar or identical elements are provided with the same reference signs or with reference signs, which are different from the corresponding reference signs only within the first digit.

FIG. 1 schematically illustrates a block diagram of a circuit 100 for regulating a DC voltage according to an embodiment. The circuit 100 comprises a controllable switch system 102, a resistor 104, a first control circuit 106 and a second control circuit 108. The controllable switch system 102 has a first terminal 101 connectable to the first DC voltage terminal 103, a second terminal 105, a first control terminal 107, and a second control terminal 109. The first control circuit 106 generates a first control signal at a first control output terminal 111 and the second control circuit generates a second control signal at a second control output terminal 113. The controllable switch system establishes an electrical connection between the first terminal 101 and the second terminal 105, if the first control signal generated by the first control circuit and supplied to the first control terminal 107 is above a first threshold or if a second control signal generated by the second control circuit 108 and supplied to the second control terminal 109 is above a second threshold. Thereby, an overvoltage occurring between the first DC voltage terminal 103 and the second DC voltage terminal 110 may be dissipated and thus reduced by current flow through the resistor 104.

In particular, the VDC signal applied between 103 and 110 is connected to inputs of the first control circuit 106 and also to inputs of the second control circuit 108 such that the two control circuits may compare the electric potentials between terminal 103 and 110.

Figure 2:
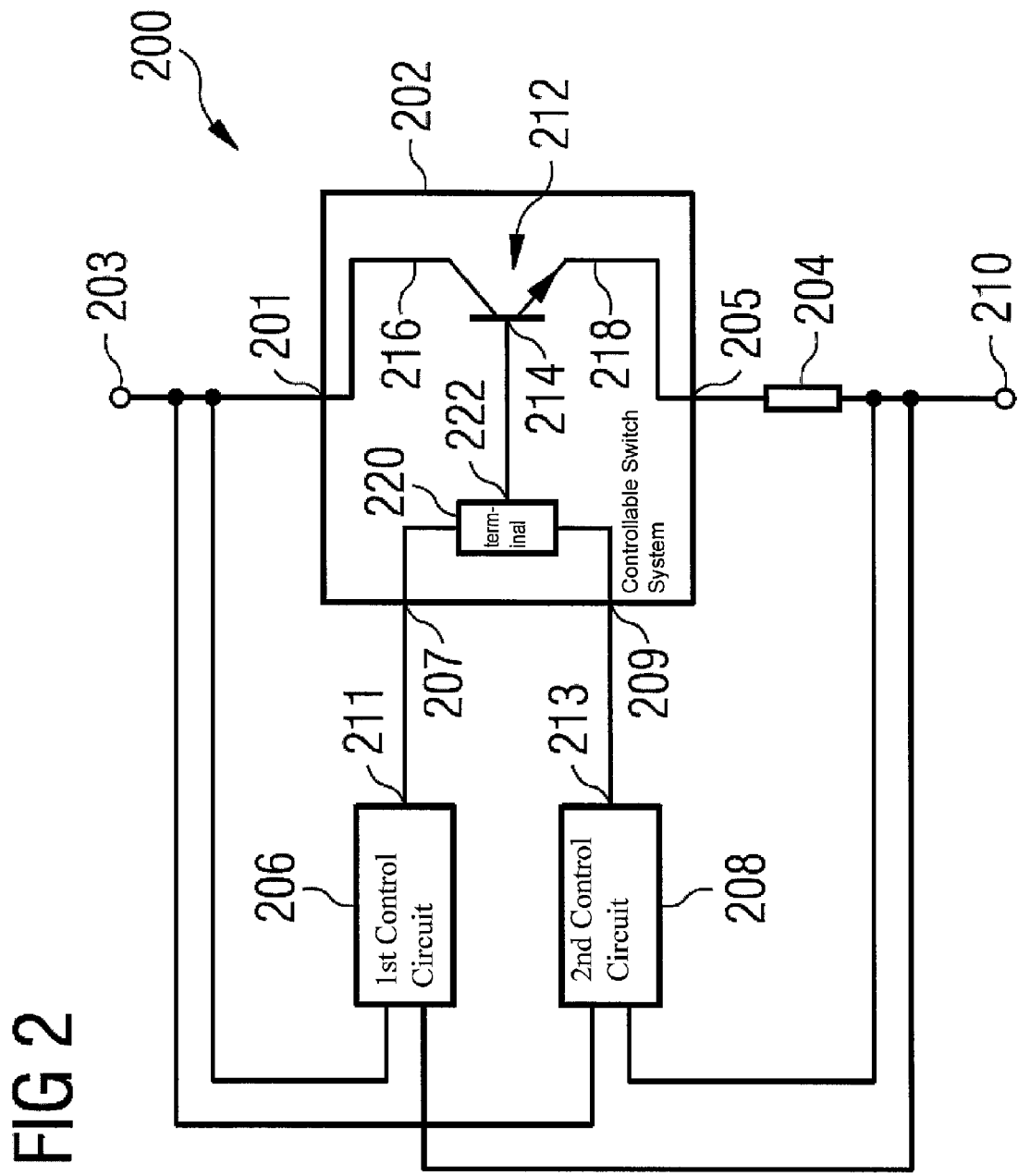
FIG. 2 schematically shows a circuit diagram of a circuit for regulating a DC voltage according to an embodiment.

FIG. 2 schematically illustrates a circuit diagram of a circuit 200 for regulating a DC voltage according to an embodiment. The circuit 200 illustrated in FIG. 2 shows similarities to the circuit 100 illustrated in FIG. 1, wherein components or elements similar in structure and/or function are designated with reference signs differing only in the first digit. Differing from the embodiment of the controllable switch system 102 illustrated in FIG. 1 the controllable switch system 202 illustrated in FIG. 2 comprises a single transistor 212 having a gate terminal 214, having a first single transistor terminal 216 and having a second single transistor terminal 218. The first control signal supplied from the first control circuit 206 to the first control terminal 207 and also a second control signal generated by the second control circuit 206 and supplied to the second control terminal 209 are supplied to a logic or processing circuit 220 which supplies a combination control signal to a logic circuit output terminal 222 which is connected to the single transistor gate terminal 214. The logic circuit 220 processes the received signals applied at the first control terminal 207 and the second control terminal 209 and derives the combination control signal therefrom.

In particular, the VDC signal applied between 203 and 210 is connected to inputs of the first control circuit 206 and also to inputs of the second control circuit 208 such that the two control circuits may compare the electric potentials between terminal 203 and 210.

In particular, in the embodiments illustrated in FIGS. 1 and 2 the first control signal generated by the first control circuit 106 and the second control signal generated by the second control circuit 108 may be based on a DC voltage applied between the first DC voltage terminal 103 and the second DC voltage terminal 110. In particular, if the DC voltage (the voltage between the first DC voltage terminal 103 or 203 and the second DC voltage terminal 110 or 210) is above a first DC voltage threshold, the first control circuit 106 generates a first control signal such that the controllable switch system is switched into a conducting state. If the DC voltage is above a second DC voltage threshold the second control circuit 108 generates a second control system such as to switch the controllable switch system 102 is in a conducting state, wherein the second DC voltage threshold is greater than the first DC voltage threshold. In particular, the second control circuit 108 or 208 is separated and differently constructed than the first control circuit 106 or 206. Thereby, the second control circuit 108 or 208 provides autonomous control of the controllable switch system 102 or 202.

Figure 3:
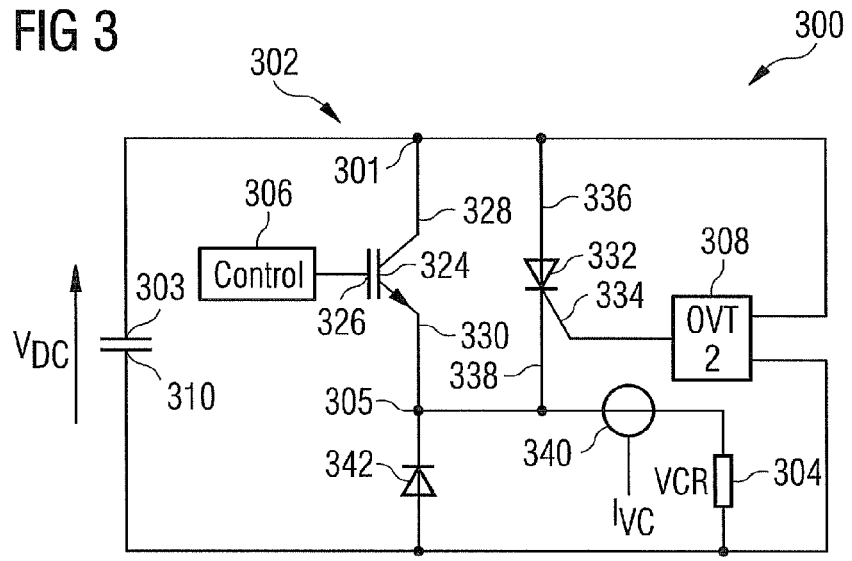
FIG. 3 schematically shows a circuit diagram of a circuit for regulating a DC voltage according to an embodiment.

FIG. 3 schematically illustrates a circuit diagram of a circuit 300 for regulating a DC voltage according to an embodiment. A DC voltage is applied between the first DC voltage terminal 303 and the second DC voltage terminal 310. The first terminal 301 of the circuit 300 is connected to the first DC voltage terminal 303.

Differing from the embodiment 200 illustrated in FIG. 2 the controllable switch system 302 comprises a first transistor 324 having a gate terminal 326 connected to the first control circuit 306, having a first transistor terminal 328 connected to the first terminal 301 and having a second transistor terminal 330 connected to the second terminal 305. In parallel to the first transistor 324 (which is in the illustrated example an IGBT) a thyristor 332 is arranged having a gate terminal 334 connected to the second control circuit 308, having a first thyristor terminal 336 connected to the first terminal 301 and having a second thyristor terminal 338 connected to the second terminal 305.

Further, the circuit 300 comprises a current measurement device 340 for measuring a current flowing through the resistor 304. The current measurement may be used for testing the circuit 300, in particular when the thyristor 332 is replaced by a force commutable switch, such as a transistor, for example an IGBT. The circuit 300 further comprises a diode 342 connected between the second DC voltage terminal 310 and the second terminal 305 (in parallel to the resistor 304). The second control circuit 308 provides the DC-link threshold voltage detection and gate pulse to the thyristor 332, where the thyristor may be fired on for a DC voltage of greater than 1400 V, for example. The thyristor 332 may then remain on, until the DC-link voltage is fully discharged and the current in the voltage clamp resistor 304 is zero, as measured using the current measurement device 340. The first control circuit 306 provides on/off control for the IGBT 324 and so the voltage clamp resistor 304, wherein the IGBT 324 may be turned on if the DC voltage is above 1150 V.

According to another (not illustrated) embodiment the thyristor 332 may be replaced by another transistor, such as an IGBT. This allows the opportunity to turn on and off the second transistor which may open up the opportunity to test the second transistor on a periodic basis, for example for 5 μs every second by an autonomous pulse generator forming an additional part of the circuit 300.

This testing may be monitored by an overall software control system by observing the current signal delivered by the current measurement device 340. Failure of the periodic turn on pulse, failure of the gate driver for the second IGBT element, failure of the second IGBT element, the failure of the current sensor 340 providing the current signal, the failing of the software to detect the periodic pulse may all result in the system being shut down in a controlled manner.

Figure 4:
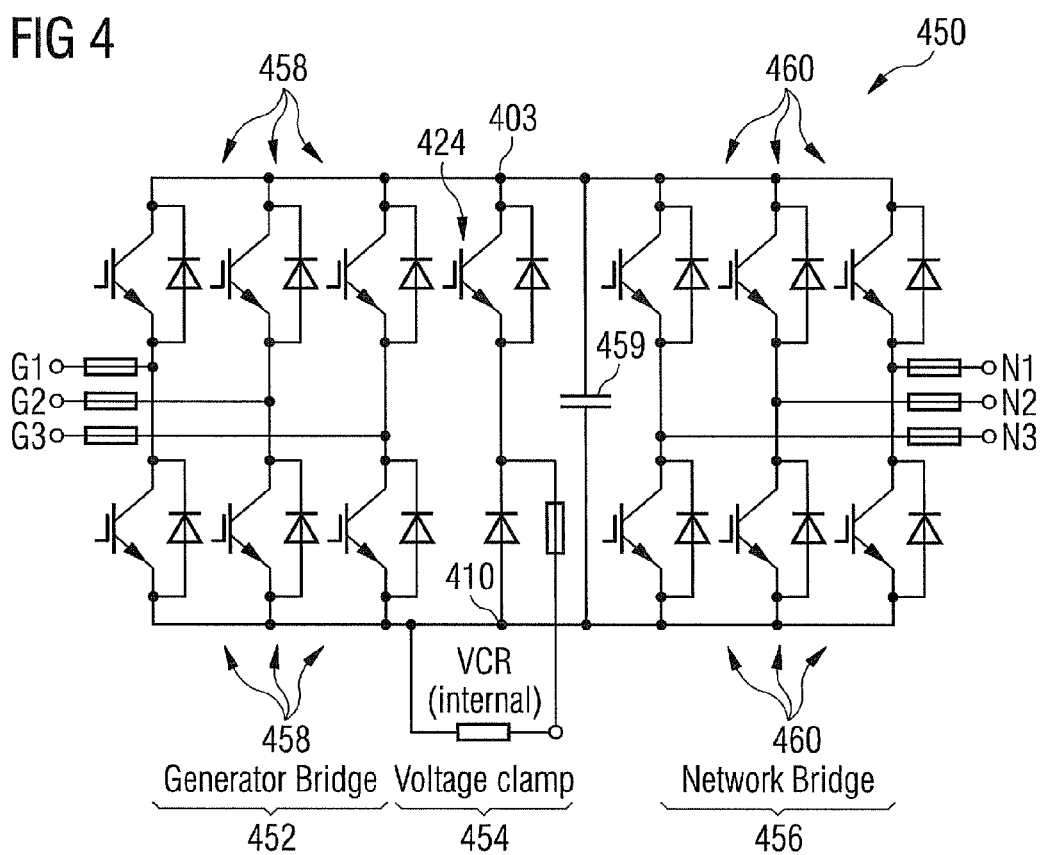
FIG. 4 illustrates a circuit diagram of an AC-to-AC converter according to an embodiment.

FIG. 4 illustrates an AC-to-AC converter 450 for converting a variable frequency AC-voltage applied at terminals G1, G2 and G3 to a fixed frequency AC-voltage supplied to the terminals N1, N2 and N3 into which a voltage clamp according to an embodiment may be integrated. The converter 450 comprises a first section 452 (also referred to as generator bridge), a voltage clamp 454 and a second section 456 (also referred to as network bridge). In the illustrated embodiment a conventional voltage clamp is illustrated comprising only one IGBT 424 which is controlled by a not illustrated control circuit. According to an embodiment the IGBT 424 may be replaced by the circuit 100, illustrated in FIG. 1, the circuit 200 illustrated in FIG. 2, or the circuit 300 illustrated in FIG. 3 (or a circuit wherein the thyristor 332 has been replaced by a transistor, such as a second IGBT, as describe above), to achieve a converter having improved protection against overvoltage between the first DC voltage terminal 403 and the second DC voltage terminal 410.

The first section 452 comprises six IGBTs 458 which are connected to the terminals G1, G2 and G3 such as to generate a substantially direct current (DC) voltage between the first DC voltage terminal 403 and the second DC voltage terminal 410. Further, the second section 456 comprises also six IGBTs 460 which are connected such as to convert the DC voltage to a fixed AC-voltage supplied to the terminals N1, N2 and N3. There may be less or more input terminals G1, G2 and G3 and there may be less or more output terminals N1, N2 and N3 of the converter 450 according to other embodiments.

The converter 450 may in particular be used for a wind turbine.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A circuit for regulating a DC voltage applied between a first DC voltage terminal and a second DC voltage terminal, the circuit comprising:
 a controllable switch system having:
  a first terminal connectable to the first DC voltage terminal,
  a second terminal,
  a first control terminal, and
  a second control terminal,
 wherein the controllable switch system is configured to establish an electrical connection between the first terminal and the second terminal, when a first control signal applied to the first control terminal satisfies a first criterion or when a second control signal applied to the second control terminal satisfies a second criterion;
 a resistor having a first resistor terminal connected to the second terminal and having a second resistor terminal connectable to the second DC voltage terminal;
 a first control circuit configured to generate the first control signal at a first control output terminal connected to the first control terminal, wherein the first control signal is generated to satisfy the first criterion, if the DC voltage is above a first DC voltage threshold;
 a second control circuit configured to generate the second control signal at a second control output terminal connected to the second control terminal, wherein the second control signal is generated to satisfy the second criterion, if the DC voltage is above a second DC voltage threshold,
 wherein the second DC voltage threshold is greater than the first DC voltage threshold.

2. The circuit according to claim 1,
 wherein the controllable switch system comprises a logic circuit which establishes an electrical connection between the first terminal and the second terminal when the first control signal applied to the first control terminal is a logical high signal and/or when the second control signal applied to the second control terminal is a logical high signal.

3. The circuit according to claim 1,
 wherein the second control circuit is further adapted to generate the second control signal to be above the second threshold during a test time interval in order to test the controllable switch system, wherein the test time interval is between $\frac{1}{100}$ and $\frac{1}{1000}$ or between $\frac{1}{100000}$ and $\frac{1}{10000}$ of an operation time of the circuit.

4. The circuit according to claim 3,
 wherein the second control circuit comprises a pulse generator for generating, in particular repeating, test pulses as the second control signal.

5. The circuit according to claim 3,
 a current sensor arranged between the second terminal and the first resistor terminal for measuring a current value indicative of an electric current flowing from the second terminal to the first resistor terminal.

6. The circuit according to claim 5, further comprising
a controller adapted to receive the current value and to receive the second control signal,
wherein the controller is adapted to indicate a failure of the circuit based on the current value and on the second control signal.

7. The circuit according to claim 1,
wherein the controllable switch system comprises a single transistor having a gate terminal connected to the first control terminal and to the second control terminal, having a first single transistor terminal connected to the first terminal and having a second single transistor terminal connected to the second terminal.

8. The circuit according to claim 1,
wherein the controllable switch system comprises a first transistor having a gate terminal connected to the first control terminal, having a first transistor terminal connected to the first terminal and having a second transistor terminal connected to the second terminal.

9. The circuit according to claim 1,
wherein the controllable switch system comprises a second transistor having a gate terminal connected to the second control terminal, having a further first transistor terminal connected to the first terminal and having a further second transistor terminal connected to the second terminal.

10. The circuit according to claim 7,
wherein the first transistor and/or the second transistor and/or the single transistor is an IGBT, a MOSFET, a bipolar junction transistor, a GTO, or an IGCT.

11. The circuit according to claim 1,
wherein the controllable switch system comprises a thyristor having a gate terminal connected to the second control terminal, having a first thyristor terminal connected to the first terminal and having a second thyristor terminal connected to the second terminal.

12. The circuit according to claim 1, further comprising:
a diode connected between the second terminal and connectable to the second DC voltage terminal.

13. The circuit according to claim 1,
wherein the second control circuit has a second control circuit input terminal connectable to the first DC voltage terminal and a further second control circuit input terminal connectable to the second DC voltage terminal.

14. The circuit according to claim 2,
wherein the second control circuit is further adapted to generate the second control signal to be above the second threshold during a test time interval in order to test the controllable switch system, wherein the test time interval is between $1/100$ and $1/1000$ of an operation time of the circuit.

15. The circuit according to claim 2,
wherein the second control circuit is further adapted to generate the second control signal to be above the second threshold during a test time interval in order to test the controllable switch system, wherein the test time interval is between $1/10000$ and $1/100000$ of an operation time of the circuit.

16. An AC-to-AC converter for converting a first frequency AC-voltage to a second frequency AC-voltage, the converter comprising:
a first converter section for converting the first frequency AC-voltage to a DC-voltage between a first DC voltage terminal and a second DC voltage terminal;
a circuit for regulating the DC voltage applied between the first DC voltage terminal and the second DC voltage terminal according to claim 1;
a capacitor connected between the first DC voltage terminal and the second DC voltage terminal; and
a second converter section for converting the DC-voltage between the first DC voltage terminal and the second DC voltage terminal to the second frequency AC-voltage.

17. A method for regulating a DC voltage applied between a first DC voltage terminal and a second DC voltage terminal, the method comprising:
establishing an electrical connection between a first terminal connectable to the first DC voltage terminal and a second terminal, if a first control signal satisfies a first criterion or if a second control signal satisfies a second criterion;
allowing current to flow through a resistor via a first resistor terminal connected to the second terminal towards a second resistor terminal connectable to the second DC voltage terminal;
generating the first control signal to satisfy the first criterion, if the DC voltage is above a first DC voltage threshold; and
generating the second control signal to satisfy the second criterion, if the DC voltage is above a second DC voltage threshold,
wherein the second DC voltage threshold is greater than the first DC voltage threshold.

* * * * *